United States Patent [19]

Dimitracopoulos

[11] 3,825,332

[45] July 23, 1974

[54] AUDIOVISUAL APPARATUS

[76] Inventor: Panayotis C. Dimitracopoulos, P.O. Box 458, Outremont, Montreal 154, Quebec, Canada

[22] Filed: Nov. 6, 1972

[21] Appl. No.: 304,203

[52] U.S. Cl. ............................................... 353/19
[51] Int. Cl. ........................................... G03b 31/06
[58] Field of Search ............ 353/15, 16, 17, 18, 19; 274/41.6 R; 179/100.3 V

[56] References Cited
UNITED STATES PATENTS

| | | | |
|---|---|---|---|
| 3,122,054 | 2/1964 | Dimitracopoulos et al. | 353/18 |
| 3,379,095 | 4/1968 | Kaprelian | 274/41.6 R |
| 3,525,566 | 8/1970 | Altman | 353/38 |

*Primary Examiner*—Louis R. Prince
*Assistant Examiner*—Steven L. Stephan

[57] ABSTRACT

Audiovisual apparatus for use with an information tablet having an image record surrounded by a spiral information track, the audiovisual apparatus including a support member supporting the source, or the guiding elements, of a radiation beam directed onto the image to retrieve the imaging information contained therein, and a rotating transducer bearingly supported about this support member, the transducer employed to scan the information track.

5 Claims, 7 Drawing Figures

AUDIOVISUAL APPARATUS

FIELD OF INVENTION

This invention relates to audiovisual and information-scanning devices and particularly to apparatuses accepting audiovisual records incorporating an image record and an information track, the latter including audio components.

DESCRIPTION OF PRIOR ART

While picture and sound synchronization was successfully realized a long time ago in the movie industry, a practical method for obtaining the same result was not available, until a few years ago, in the photographic slides or transparencies field.

In his U.S. Pat. Nos. 3,302,520, 3,282,154, 3,644,032 and 3,717,407 the inventor of the present invention taught a method of complete synchronization which consisted of directly and permanently associating a generous length of recorded sound (audio) information with each visually-projectable image or visual slide unit, in such a way that a properly designed projector, for example as described in his U.S. Pat. Nos. 3,122,053, 3,122,054, 3,480,356 and 3,730,618 can simultaneously reproduce both audio and visual records of an audiovisual slide unit, individually or sequentially, without any special requirement as to synchronization, the latter following inevitably from the fact of integration of the two kinds of records upon a single audiovisual slide unit.

In the abovementioned patents the inventor of the present invention taught a form of audiovisual slides consisting of a projectable transparency, such as a projection diapositive, positive film, or the like, carried directly upon, or forming part of, a sound record of the spiral type, (for example, but not necessarily, of the magnetic or phonographic type), adapted for ready reproduction by a special form of transducer (for example, but not exclusively, a magnetic or phonographic pick up head).

Audiovisual slides and audiovisual apparatuses according to the teachings of the abovementioned patents are now the objects of commercial manufacture and in order to scan the spiral information (sound) track either the record component, or the transducer, is rotated. When a transducer is rotatably arranged about the optical projection beam, its plane of rotation may face either of the two surfaces of the slide. In commercial manufacture the plane of rotation is usually placed between the slide and the projection lens and to do so, it is necessary to employ bearings having a large internal diameter. This caused a number of technical difficulties and manufacturing problems such as tolerances, surface finishes, smoothness of rotation, which had to be solved. These problems were overcome but at some cost.

OBJECTS OF THE INVENTION

It is therefore the object of this invention to provide novel forms of rotating transducers which greatly simplify the manufacturing problems while they actually increase the quality, increase the reliability and decrease the cost of the apparatuses.

It is a further object of the present invention to provide an audiovisual apparatus rotatably mounting the transducer on small and simple bearings located behind the source illuminating the transparency.

It is a further object of the invention to provide an audiovisual apparatus rotatably mounting the transducer on small and simple bearing means surrounding a concentrated illumination or radiation beam of small diameter.

It is a further object of the invention to provide an audiovisual apparatus rotatably mounting the transducer on small and simple bearings, these bearings mounted on the member that supports the illumination source or the radiation beam source.

It is a further object of the invention to provide an audiovisual apparatus rotatably mounting the transducer on small bearing means which, in turn, are mounted on the member that supports illumination-reflecting means, such as mirrors, to direct a radiation beam (such as an illuminating beam) onto the image.

It is a further object of the invention to provide an audiovisual apparatus with a substantially stationary source of radiation beam and deflecting the beam to scan the information (sound) track on the audiovisual tablet. Thus, scanning is accomplished without any physical contact between the sound track and the scanning means (transducer).

It is a further object of the invention to provide an audiovisual apparatus with improved and novel transducer-scanning arrangements.

Other objects of the invention will become evident from the ensuing description, illustration and claims.

DESCRIPTION OF PREFERRED EMBODIMENTS

Figure 1:
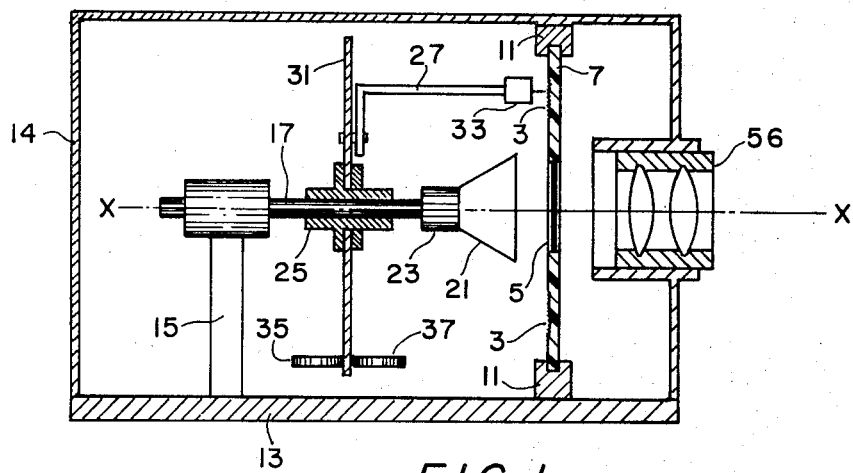
FIG. 1 is a partly sectional elevation of an audiovisual apparatus according to the invention.
Figure 2:
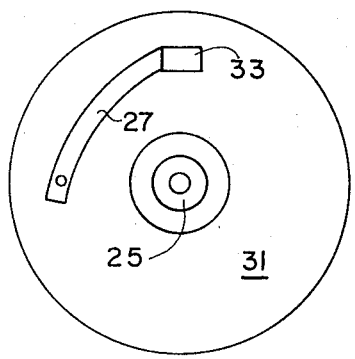
FIG. 2 is a plan view of the rotating member 31.

FIGS. 1 and 2 illustrate one of the embodiments of an audiovisual apparatus built according to the teachings of this invention.

The audiovisual tablet 7 has in its center a projectable transparency 5 which is surrounded by a spiral sound track 3. Various embodiments of this audiovisual slide have been described and illustrated in several patents by the same inventor, including U.S. Pat. Nos. 3,302,520, 3,282,154, 3,644,032 and 3,717,407 and need no further elaboration here.

The audiovisual tablet 7 is placed and held immovably on support 11 which is formed with an opening exposing the projection slide 5 to the projection beam. The projection beam consists chiefly of two groups of elements separated by the projection slide itself namely, (a) the light source with its light-guiding mirrors and condensing lenses and (b) the projection lens system, (such as the projection lens cell 56).

Support 11 is secured to frame 13. Shaft 17 is also secured (directly or through interconnecting elements) to frame 13, for example by means of bracket 15, in such a way that its axis substantially coincides with the optical (projection) axis $x-x$. The light source etc. element (a), as abovedefined, is secured on, or at one end of, shaft 17. This light source etc. element (a) may take several forms and, as an illustrative example, one will be described: on shaft 17, socket 23 is firmly secured and accepts projection lamp 21 which may be as illustrated in FIG. 1, of the "sealed beam" type (which requires a minimum of external condensing lens means or none at all) or may be of any other desired type but, at any rate, it illuminates substantially uniformly the projection slide 5.

Rotating member 31 is rotatably supported on shaft 17, for example through bearing means 25. In its turn, member 31 supports pivotally transducer-arm 27 carrying transducer 33 which engages sound track 3 in an information-scanning relationship. To do so, it is necessary to rotate transducer 33 about the axis of the spiral information track 3. Accordingly, motor-driving means must be supplied and this can be accomplished in a number of ways, one of which will be described as an illustration. Member 31 (which in its simplest form need only be a bracket secured to bearing 25 and supporting arm 27) is a turntable driven by the usual means employed in the phonographic art, that is belts, pulleys, idler wheels, etc. coupled to motor means or, as illustrated in FIG. 1, member 31 is substantially disc-shaped and is "pinched" between two opposed rollers 35 and 37 at least one of which is motor-driven.

It is now evident that the transducer 33 must rotate about the axis of the spiral sound track which it is convenient if it substantially coincides with the optical axis $x-x$, but, in any event, the bearing 25, can be simple, small, inexpensive and dependable, for example like those employed in phonographic turntables.

Figure 3:
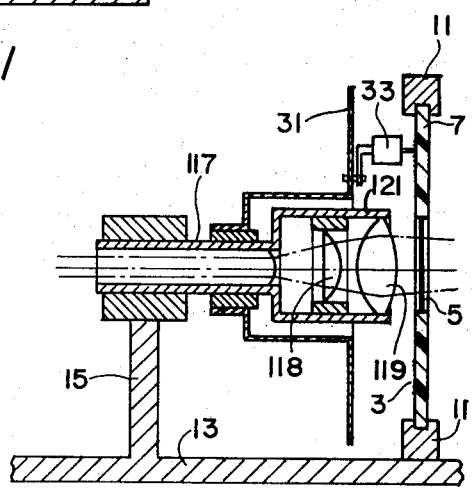
FIG. 3 is a, partly sectional, elevation of another embodiment of the apparatus according to the invention, in which some parts have been omitted to simplify the illustration.

Electric conduits must reach the projection light and this may be conveniently accomplished by passing them under the bearing or simply through the shaft 17. Of course shaft 17 may also be a hollow shaft through which the electric leads may freely pass. A hollow shaft suggests the following possibility: Cool air may be pumped through it or warm air may be removed through it in order to cool the projection light. A hollow shaft may also be employed to pass through it a radiation beam (light beam) which is then dispersed and directed onto the photographic slide by means of appropriate lenses housed at its end, as shown in FIG. 3 where 117 is the hollow shaft (equivalent to the shaft 17 of FIG. 1) and 121 is a condensing lens housing (equivalent to light source 21 of FIG. 1). Condensing lenses 118 and 119 are only an example of possible lens means that may be employed for "opening-up" and directing the radiation beam on to the projection slide 5. In this way, the actual source of the radiation beam may also be placed entirely outside (behind) the hollow shaft 117 in order to shorten the distance between the rotating member 31 and the audiovisual tablet 7 and also in order to facilitate or simplify the provisions for cooling the light source.

Figure 4:
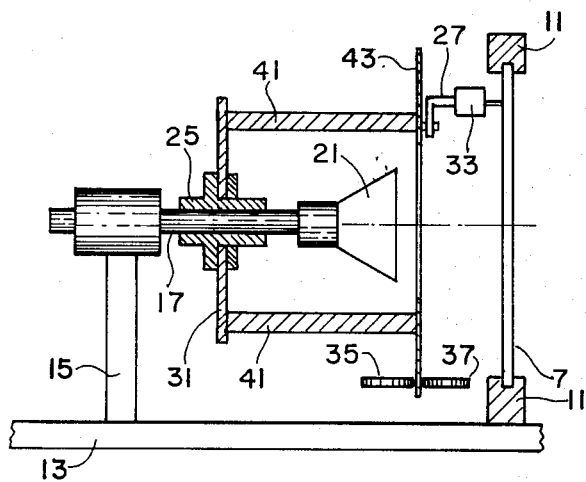
FIG. 4 is a, partly sectional, elevation of still another embodiment of the audiovisual apparatus according to the invention, again with some parts missing.

The actual arrangement of the various members and components may vary considerably and therefore FIG. 4 illustrates one of such possible rearrangements of components concerning the rotatable turntable and transducer arm.

Shaft 17, bearing 25 and member 31 are similar to those abovedescribed. The audiovisual tablet 7 is likewise immovably held on a support similar to that illustrated in FIG. 1. However in order to shorten its size, the transducer arm 27 is pivotally mounted on member 43 which is in turn mounted on member 31 by means of stand-offs 41. If member 43 is an annular member, it may be convenient to drive it directly by the abovedescribed means, such as the two opposed rollers 35 and 37.

It is evident that in order to feed to an amplifier the information collected by the rotating transducer, slip-ring means may be conveniently employed. These slip-ring means are not shown in the illustrations and need no further description here as they are well known in the art and have been fully described and illustrated in the abovereferred U.S. patents by the same inventor.

Figure 5:
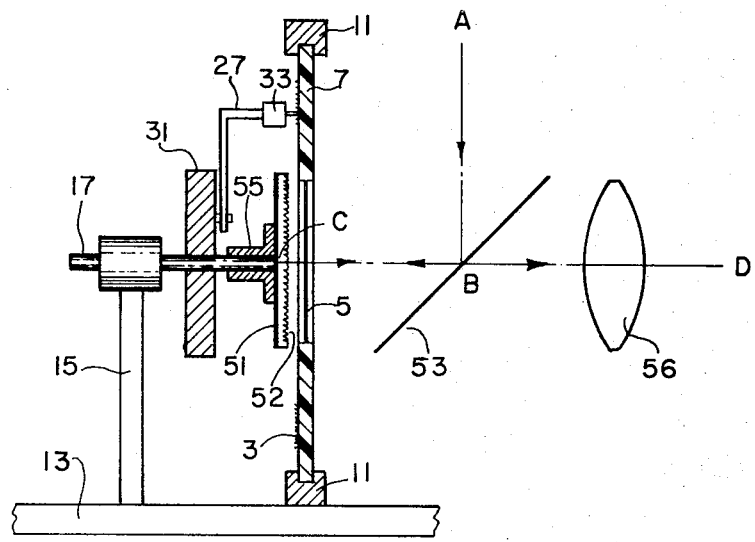
FIG. 5 is an elevation illustrating some components of an apparatus according to the invention.

FIG. 5 illustrates, in a diagrammatic fashion, another possible rearrangement of components according to the teachings of the invention: Audiovisual tablet 7 is immovably held on support 11 as previously described. Shaft 17 rotatably supports arm 27, supporting transducer 33, which scans spiral sound track 3. However the rotatable arm 27 is greatly simplified because the projectable image is illuminated from the projection-lens side either in the well known epidiascopic fashion or by directing the illumination through the transparency onto a mirror 51 and back to the transparency and thereafter to the projection lens 56. To do so, it may be convenient to place a prism (or appropriate reflecting mirror) 53 and directing the illumination along the path A-B-C-D (or whatever alternative path is desired). It may be useful to place a lens 52, such as a Fresnel lens, immediately in front of mirror 51 in order to better direct the light along the desired path. The mirror 51 (and the lens 52) are immovably secured on shaft 17, for example by means of flange 55.

Figure 6:
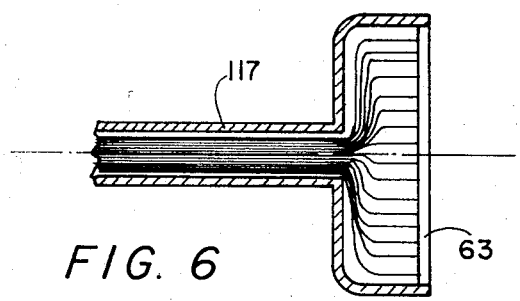
FIG. 6 is a sectional view of an illuminating and bearing-mounting embodiment according to the invention.

Instead of illuminating the transparency from the projection lens side it is possible to have substantially the arrangement of components as illustrated in FIG. 5 and as abovedescribed, with the following alternative differences: Flange 55 may support a substantially flat illuminating device deriving its light through fiber optics means passing through stationary hollow shaft 117 and opening up to disperse the light on illuminating surface 63, as diagrammatically illustrated in FIG. 6. Alternatively, flange 55 may support a flat illuminating screen or surface, such as the secondary emission devices being now developed or an equivalent illuminating device. These arrangements will become particularly useful and commercially practical when used in conjunction with the radiation (light) amplification devices which are also being developed now.

In the final analysis, it is not mandatory that the transducer itself be physically moved. It is only necessary that the scanning means be moved, for example rotated and/or rotatably directed to scan the spiral information track and this may equally well be accomplished by directing an appropriate scanning (radiation) beam along the spiral path of the information track. Mechanical, optical, electromechanical, electromagnetic, electronic, etc. (or a combination thereof) beam-deflecting means may be employed to progressively guide such beams along the desired scanning path to sense the information recorded in the information track.

The beam itself may be of the Cathode Ray Tube type, i.e. such as used in oscilloscopes, television screens and similar or equivalent visual-display devices, or it may be a laser beam. The information track on the audiovisual tablet will be of a type that may be readily scanned by the particular beam chosen, for example such information track may be photographic (and this term includes holographic).

When such beams are employed, the sound and/or information track need not necessarily be spiral and other path configurations become possible but at any rate, the beams will be directed to follow whatever path is chosen in the usual scanning relationship.

Figure 7:
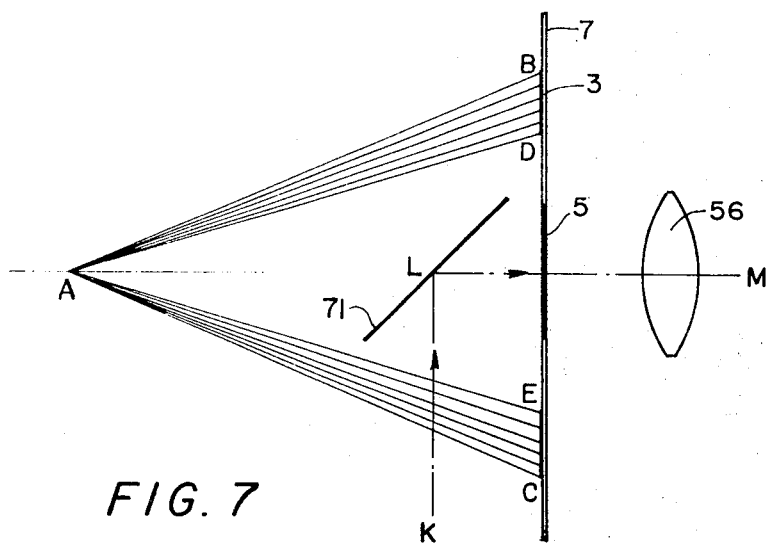
FIG. 7 is a diagramatic illustration of still another embodiment according to the invention.

A diagrammatic illustration of an embodiment of the abovedescribed beam-moving principle is shown in FIG. 7.

A thin audiovisual tablet 7 is held immovably by an appropriate support on the apparatus (the support being substantially as, or equivalent to, that described in connection with FIG. 1) The image 5 is illuminated from the projection-lens side in the epidioscopic fashion, or as described above in connection with FIG. 5. The image can equally well be illuminated in the usual slide-projection fashion, i.e. from the rear, except that it may be convenient to place a mirror 71 and direct the rays in the path K–L–M. The beam, as abovedescribed is emitted at A and is directed to scan the information track (for example spiral track 3 surrounding image 5). Thus the information-scanning beam will move within the volume defined by conical surfaces A B C and A D E will intersect the imaging beam K–L–M but, being of different nature and/or different wavelengths, will not interfere with it.

It is interesting to note that this or equivalent information-scanning arrangements lend themselves to extremely good information-retrieval, even if the information track 3 is not placed exactly at its optimum position, (or if the audiovisual tablet 7 is not at its theoretically optimum position). This enables the relaxation of manufacturing tolerances and has therefore a tremendous practical significance. A method permitting the above is the following: The information track 3 contains the desired information (for example sound-information) but also contains beam-guiding and timing information. These beam guiding and timing components are separated and are fed to the appropriate electronic means to control the location and scanning speed of the beam.

Any of the abovedescribed apparatus and parts thereof will be, of course, utilized in conjunction with optical electronic, mechanical (for example slide-changing mechanisms) and other desirable means, such as, but not exclusively, as disclosed in the abovereferred prior patents by the same inventor. Appropriate housings will enclose and protect the apparatuses, such as housing 14 of FIG. 1, or more elaborate housings, for example, but not exclusively, housings as disclosed in the abovereferred patents by the same inventor.

As it has already been inferred, other than purely "optical" images, or other than visible to, or recognizable by, the naked eye images may be employed, and the optical (or equivalent) elements in the apparatus will be appropriately modified, within the spirit of the invention.

The information (sound) track may also be of any desired type, such as phonographic, magnetic, optical, etc. and the scanning transducers will be of the appropriate type, i.e. capable of sensing the particular sound track employed.

Likewise, while a number of specific embodiments of parts, components and apparatus according to the invention have been disclosed herein, it will be understood that modifications and variations, within the spirit of the invention, are possible and may occur to those skilled in the art and therefore, it is not intended to exclude such variations and modifications which properly fall within the scope of this invention.

What is claimed is:

1. Apparatus for use with an audiovisual tablet having an image record and a spiral information track, said apparatus including:
   a. seat means receiving said tablet;
   b. source means producing a radiation beam and guiding means directing said radiation beam onto said image to retrieve the imaging information contained therein;
   c. shaft means supporting at least one of said source means and guiding means;
   d. a rotating transducer to scan said information track, said transducer mounted for rotation on bearing means surrounding said shaft means, said source means disposed between said tablet and said bearing means.

2. Apparatus according to claim 1 wherein said source means is a projection lamp.

3. Apparatus according to claim 1 wherein at least a part of said shaft means is of a substantially cylindrical shape whose axis is substantially co-axial to the central axis of said spiral track.

4. Apparatus for use with an audiovisual tablet having an image record and a spiral information track, said apparatus including:
   a. seat means receiving said tablet;
   b. hollow shaft means having an internal cross sectional area smaller than the surface area of said image;
   c. a rotating transducer to scan said information track, said transducer mounted for rotation on bearing means surrounding said shaft means;
   d. beam-guiding means supported on said shaft means, which spread and direct a substantially collimated radiation beam, passing through said hollow shaft means, onto said image to retrieve the imaging information contained therein, said beam-guiding means disposed between said tablet and said bearing means.

5. Apparatus for use with an audiovisual tablet having an image record and a spiral information track, said apparatus including:
   a. seat means receiving said tablet;
   b. shaft means supporting beam-reflecting means disposed adjacent to and facing said image;
   c. a rotating transducer to scan said information track, said transducer mounted for rotation on bearing means surrounding said shaft means, said beam-reflecting means disposed between said tablet and said bearing means;
   d. a radiation beam passing through said image and reflected back by said beam-reflecting means onto said image to retrieve the imaging information contained therein.

* * * * *